(12) United States Patent
Matsuoka et al.

(10) Patent No.: US 8,552,611 B2
(45) Date of Patent: *Oct. 8, 2013

(54) COIL END STRUCTURE OF ROTATING ELECTRIC MACHINE

(75) Inventors: Yoshihisa Matsuoka, Tochigi (JP); Kazuhito Hiraga, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 13/295,285

(22) Filed: Nov. 14, 2011

(65) Prior Publication Data

US 2012/0200190 A1 Aug. 9, 2012

(30) Foreign Application Priority Data

Feb. 9, 2011 (JP) ................... 2011-026376

(51) Int. Cl.
*H02K 3/04* (2006.01)
(52) U.S. Cl.
USPC .......................................... 310/201; 310/260

(58) Field of Classification Search
USPC .................................. 310/179, 201, 260, 208
See application file for complete search history.

(56) References Cited

U.S. PATENT DOCUMENTS

| 693,579 | A | * | 2/1902 | Wait | 310/201 |
| 6,548,933 | B2 | * | 4/2003 | Yasuhara et al. | 310/203 |
| 6,791,227 | B2 | * | 9/2004 | Yasuhara et al. | 310/201 |
| 6,806,611 | B2 | * | 10/2004 | Bharaj et al. | 310/208 |

FOREIGN PATENT DOCUMENTS

WO 2008/020471 2/2008

* cited by examiner

*Primary Examiner* — Dang Le
(74) *Attorney, Agent, or Firm* — Rankin, Hill & Clark LLP

(57) ABSTRACT

The present invention provides a coil end structure of a rotating electric machine which is able to miniaturize the coil end structure without having an insulation coating of a flat wire being affected. A coil segment 4 is composed of a plurality of flat wires. A surface of each flat wire confronting another in a slot 2a (legs 41 and 41) is identical to the surface confronting the other at a coil end (head 42).

8 Claims, 10 Drawing Sheets

COIL END STRUCTURE OF ROTATING ELECTRIC MACHINE

BACKGROUND OF THE INVENTION

1. Field of the Invention

The present invention relates to a coil end structure of a rotating electric machine such as an electric motor, a generator or the like.

2. Description of the Related Art

Figure 10:
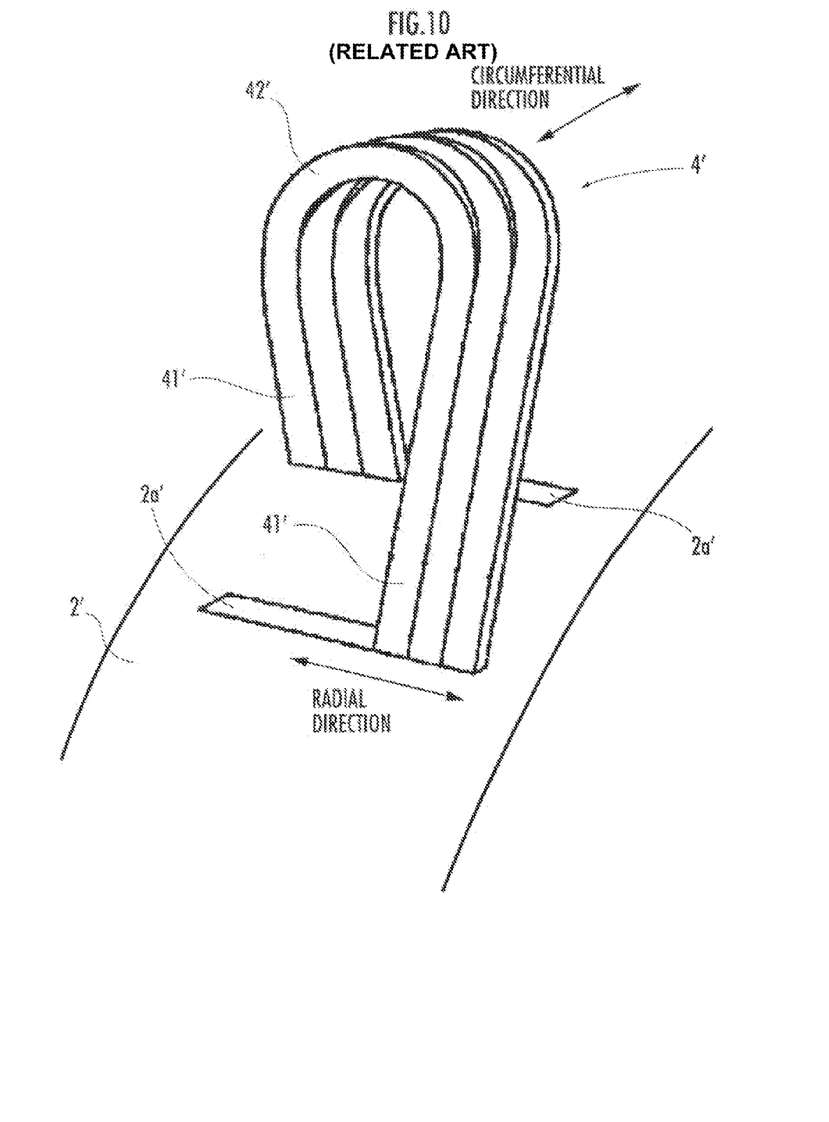
FIG. 10 is an explanatory view illustrating a conventional coil end structure.

Conventionally, there has been known a rotating electric machine provided with a stator and a rotor, such as an electric motor, a generator or the like (for example, refer to Patent Document 1: Published PCT International Application No. 2008/020471). As illustrated in FIG. 10, the stator in the rotating electric machine disclosed in Patent Document 1 is provided with a stator core 2', a plurality of slots 2a' disposed in the stator core 2' in such a way that the plurality of slots 2a' are disposed at intervals in the circumferential direction of the stator core 2' and are configured to penetrate the stator core 2' in the axial direction thereof, and a coil.

The coil is constructed by disposing a plurality of U-shaped coil segments 4' having a pair of legs 41', 41' and a head 42' joining the two legs 41', 41' at either one end portion of each leg 41' in such a way that the legs 41', 41' pass through the slot 2a' to project from the slot 2a', and joining the corresponding projecting portions of the legs 41', 41' projecting from the slot 2a'.

The coil segment 4' is constructed from a bundle of a plurality of flat wires; and the head 42' of the coil segment 4' constitutes the coil end. According to the coil end in Patent Document 1, the adjacent flat wires are disposed to be aligned in the circumferential direction of the stator core 2' in an attempt to miniaturize the coil end.

The U-shaped flat wire constituting the U-shaped coil segment 4' is constructed by curving the flat wire into a U shape to form a pair of legs 41', 41' and the head 42' which joins the two legs 41', 41'; and by curving the two legs 41', 41' so that tip ends (lower end) of the two legs 41', 41' are spaced from each other in the normal line direction (the circumferential direction in FIG. 10) with respect to a plane including the extending direction of the head 42'. The legs 41' of each flat wire of the coil segment 4' positioned in the slot 2a' are disposed to be aligned in a row in the radial direction of the stator core 2'.

However, in the conventional coil end structure, the confronting surfaces of the flat wires at the coil end are different from the confronting surfaces of the flat wires in the slot, respectively. Therefore, it is easy for a corner portion of a flat wire to have a contact with an adjacent flat wire at the coil end, and thereby, there occurs a problem that an insulation coating of the flat wire may be peeled due to such effects as rotation vibrations or the like from the rotating electric machine.

SUMMARY OF THE INVENTION

The present invention has been accomplished in view of the aforementioned problems, and it is therefore an object of the present invention to provide a coil end structure of a rotating electric machine which is able to miniaturize the coil end structure without having an insulation coating of a flat wire being affected.

[1] To attain an object described above, a coil end structure of a rotating electric machine of the present invention comprises a stator and a rotor; the stator is provided with a stator core, a plurality of slots disposed in the stator core in such a way that the plurality of slots are disposed at intervals in the circumferential direction of the stator core and are configured to penetrate the stator core in the axial direction thereof, and a coil; the coil is constructed by disposing a plurality of U-shaped coil segments, each of which has a pair of legs and a head joining two legs at either one end portion of each leg, in such a way that the legs pass through the slot and project from the slot, and joining projecting portions of the legs projecting from the slot; the coil segment is constructed from a bundle of a plurality of flat wires; and the head of the coil segment is a constituent component of the coil end and is disposed in such a way that adjacent flat wires are aligned in the circumferential direction of the stator, wherein a surface of a flat wire confronting a surface of another adjacent flat wire at the head of the coil segment, which constitutes the coil end, is identical to the surface of the flat wire confronting the surface of the adjacent flat wire at the leg inserted in the slot.

According to the present invention, the adjacent flat wires at the head are aligned in the circumferential direction of the stator; in comparison to the case where they are aligned in the radial direction of the stator, it is possible to reduce the dimension of the coil end in the axial direction, and it is possible to miniaturize the coil end. Further, in the present invention, a surface of a flat wire confronting a surface of another adjacent flat wire at the coil end (head) is identical to the surface of the flat wire confronting the surface of the adjacent flat wire in the slot. Thereby, it is possible to prevent a corner portion of a flat wire from contacting an adjacent flat wire as in the conventional art, and consequently, preventing the insulation coating from being peeled off.

[2] In the present invention, it is desirable that the head of the coil end is formed with an S-shaped portion curved into an S shape.

In the case of using the coil segments of the same shape to construct the coil, it is necessary to dispose one leg at an inner side in the radial direction of the slot and the other leg at an outer side in the radial direction of the slot. According thereto, one leg of another coil segment can be inserted into a portion in the inner side in the radial direction of the slot, into which the other leg has been inserted; thereby, it is possible to satisfy all the slots with the coil segments of the same shape.

However, in the case where the two legs are inserted to the inner side and the outer side in the radial direction of the slot, respectively, the head of the coil segment intersects the inner side in the radial direction and the outer side in the radial direction between the slots inserted with the two legs. Therefore, if the coil is constructed to have plural phases such as an alternating current of 3 phases, a slot where a current of another phase flows should be present in the coil segment between the slots inserted with the two legs. Thus, if the dimension in the circumferential direction of the intersection area between the inner side in the radial direction and the outer side in the radial direction at the head of the coil segment is great, there will be a problem that each coil segment may not be appropriately inserted into the slot.

As mentioned in the above, by forming the S-shaped portion curved into the S-shape in the head of the coil end, it is possible to intersect the inner side in the radial direction and the outer side in the radial direction at the S-shaped portion so as to reduce the dimension of the intersection area in the circumferential direction. According thereto, it is not only possible to appropriately insert each coil segment into the slot but also possible to compactly overlap the heads of coil segments extended from adjacent slots, making it possible for the coil end to be miniaturized.

[3] The coil segment of the present invention can be produced from a production method comprising: an S shape processing step of forming the S-shaped portion by aligning a plurality of flat wires in a row into a bundle and curving a central portion of the flat wire bundle into an S shape in the alignment direction; a circumferential direction bending step of bending both end portions of the flat wire bundle with the S-shaped portion at the center in the alignment direction according to the position of the slot; a head inclination forming step of bending both end portions of the flat wire bundle to incline from the central portion at a predetermined angle toward the axial direction of the stator; and a leg forming step of forming the legs by bending both end portions of the flat wire bundle to conform to the penetrating direction of the slot.

According to the production method, a plurality of flat wire can be bent in bulk at one time; in comparison to the case where the flat wires are produced by changing the bending curvature of each flat wire one by one, it is possible to simplify the production process.

DETAILED DESCRIPTION OF THE PREFERRED EMBODIMENTS

Figure 1:
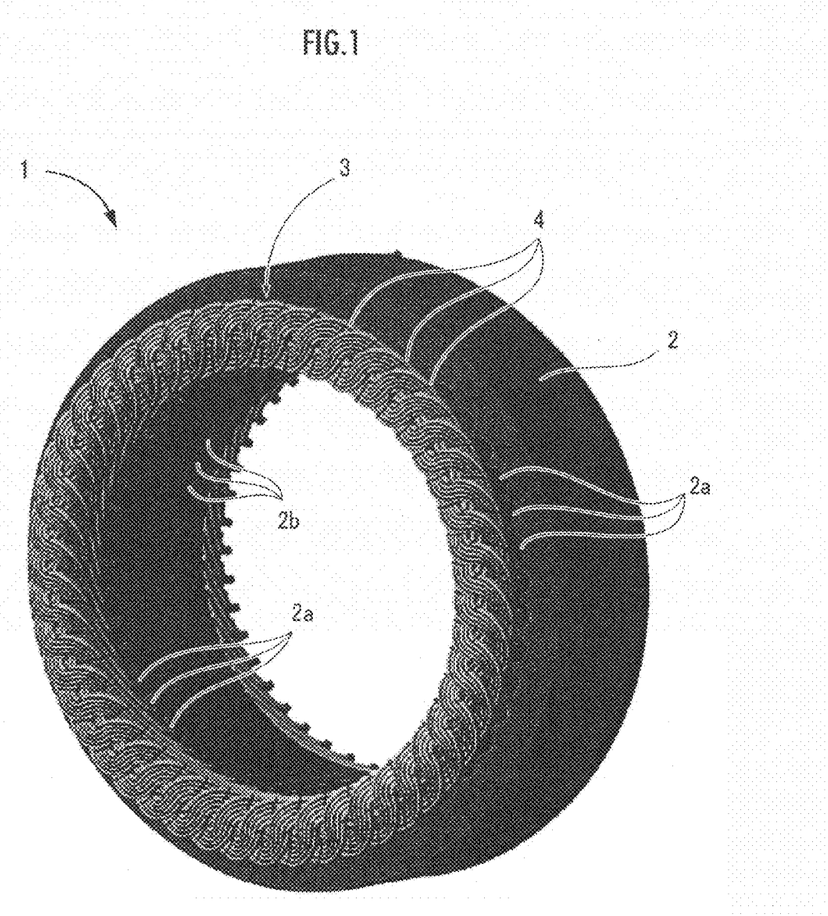
FIG. 1 is a perspective view illustrating a stator of a rotating electric machine applied with a coil end structure according to an embodiment of the present invention.

An embodiment of a coil end structure according to the present invention will be described with reference to FIG. 1 to FIG. 9. FIG. 1 illustrates a stator 1 of a rotating electric machine such as an electric motor, a generator or the like. The stator 1 is formed to have a cylindrical shape. A rotor (not shown) of the rotating electric machine is disposed inside the stator 1 in such a way that the rotor is rotatable therein freely.

The stator 1 is composed of a stator core 2 and a coil 3. The stator core 2 is of a cylindrical shape and is provided with a plurality of slots 2a disposed in such a way that the plurality of slots 2a are disposed at intervals in the circumferential direction of the stator core 2 and are configured to penetrate the stator core 2 in the axial direction thereof. Each slot 2a is formed in such a way that the sectional shape thereof in the radial direction of the stator core 2 extends radially in the radial direction from the center side of the stator core 2. Each slot 2a communicates with the inner circumferential surface of the stator core 2 via a slit 2b formed in the stator core 2. However, the slit 2b is not essential.

Figure 2:
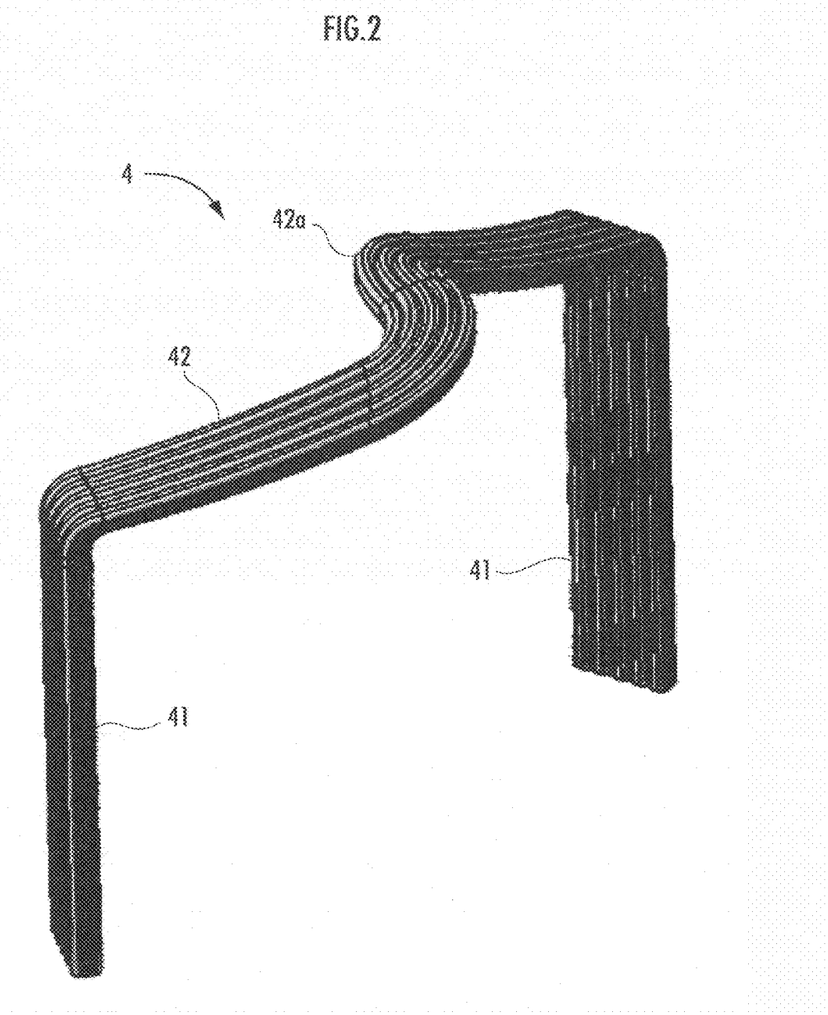
FIG. 2 is a perspective view illustrating a coil segment according to the present embodiment.

A coil segment 4 illustrated in FIG. 2 is inserted into the slot 2a from one side and projecting portions projected from the other side of the slot 2a are torsionally bent in the circumferential direction and joined together to form the coil 3. The coil segment 4 is formed into a U shape by aligning a plurality of lead wires (5 lead wires in the drawing) having a rectangular shape in section (flat wires) in a row into a bundle in such a way that surfaces of the lead wires having a wider width confront each other. The coil segment 4 is provided with a pair of legs 41 and 41, and a head 42 joining the two legs 41 and 41 at one end (the upper end in the drawing). It is acceptable that the coil segment 4 is obtained by aligning a plurality of flat wires in a width direction into a bundle, for example, aligning a plurality of flat wires in a row into a bundle in such a way that surfaces of the flat wires having a narrower width confront each other.

Figure 3A:
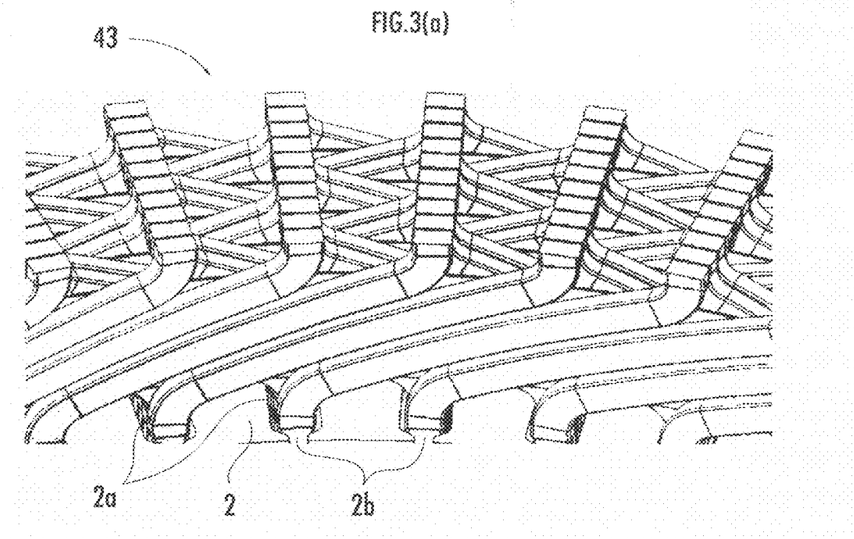
FIGS. 3(a) and 3(b) are explanatory views illustrating a projecting portion of the coil segment according to the present embodiment.
Figure 3B:
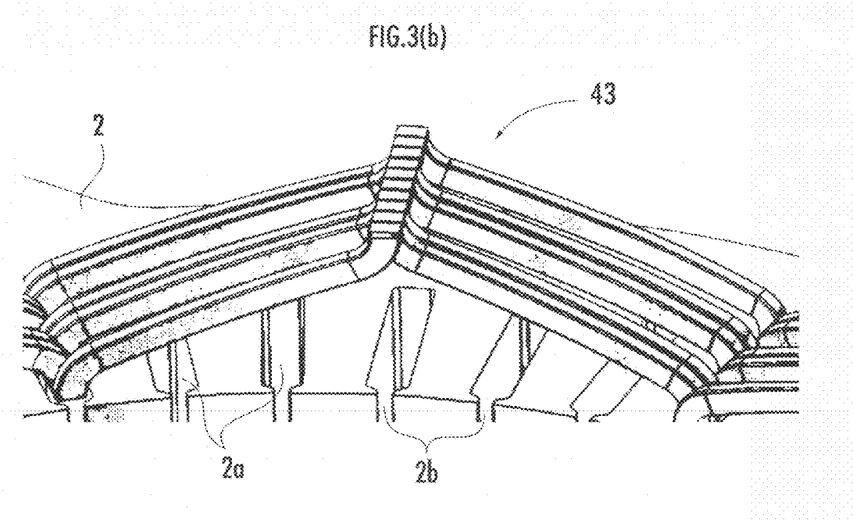

The center of the head 42 is formed with an S-shaped portion 42a curved into an S shape in the alignment direction of the flat wires. The head 42 is configured to incline downwardly from the center (the center of the S-shaped portion 42a) toward the two legs 41 and 41. The leg 41 of the coil segment 4 is inserted to a corresponding slot 2a from one side and projects from the other side of the slot 2a. The projecting portion 43 of the leg 41 projecting from the other side of the slot 2a is torsionally bent in the circumferential direction of the stator 1 as illustrated in FIG. 3(a), and the corresponding projecting portions 43 are joined via TIG welding or the like. Thereby, the coil 3 is obtained. In addition, the coil 3 in the present embodiment is a 3-phases coil which is composed of a U phase, a V phase and a W phase. The legs 41 of the coil segment 4 inserted in each slot 2a are arrayed in the order of U phase, U phase, V phase, V phase, W phase and W phase in the circumferential direction. In FIG. 3(b), only a coil of 1 phase out of the 3 phases (for example, U-phase coil) is illustrated.

Hereinafter, with reference to FIG. 4 through FIG. 7, a production method of the coil segment 4 illustrated in FIG. 2 will be described.

To produce the coil segment 4, firstly, a plurality of flat wires (5 flat wires in FIG. 4) are aligned in a row with the surfaces of a wider width confronting each other to form a bundle of a flat wire bundle W. Thereafter, the procedure moves to an S shape processing step illustrated in FIG. 4 in which the flat wire bundle W is disposed in an S shape processing die 51. The S shape processing die 51 is composed of a movable die 51a illustrated in the upper side of FIG. 4(a) and a fixed die 51b illustrated in the lower side of FIG. 4(a). One end portion of the flat wire bundle W is held in an inclined state by the movable die 51a, and the other end portion of the flat wire bundle W is held in an inclined state by the fixed die 51b.

A chevron shaped convex portion 51c and a chevron shaped convex portion 51d are disposed at opposite surfaces of the movable die 51a and the fixed die 51b, respectively, with the positions thereof deviated in the lateral direction. Thereby, as illustrated in FIG. 4(b), by moving the movable die 51a toward the fixed die 51b, the central portion of the flat wire bundle W is bent into the S shape to form the S-shaped portion 42a.

Figure 5A:
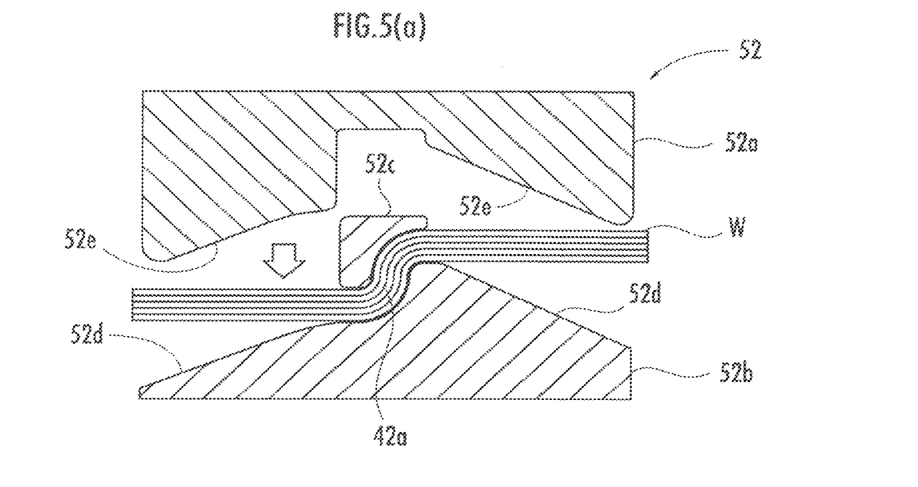
FIGS. 5(a), 5(b), and 5(c) are explanatory views illustrating a circumferential direction bending step in the production method of the coil segment according to the present embodiment.
Figure 5B:
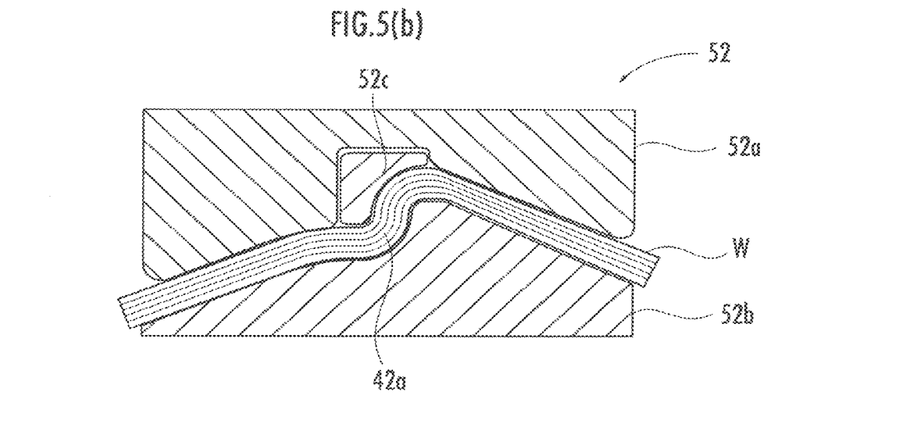

Since the slots 2a are disposed at intervals in the circumferential direction, it is necessary to bend the flat wire bundle W along the circumferential direction. The bending step is defined as a circumferential direction bending step. A circumferential direction bending die used in the circumferential direction bending step is illustrated in FIG. 5. The circumferential direction bending die 52 is composed of a movable die 52a illustrated in the upper side of FIG. 5(a) and FIG. 5 (b) and a fixed die 52b illustrated in the lower side of FIG. 5(a) and FIG. 5(b).

The flat wire bundle W is held on the fixed die 52b with the S-shaped portion 42a thereof pressed by a holding member 52c disposed at a central portion of the fixed die 52b. Both side edges of the fixed die 52b are provided with inclined surfaces 52d and 52d which are configured to be inclined downwardly. Similarly, the movable die 52a is also provided with inclined surfaces 52e and 52e which are configured to be inclined so as to match with the inclined surfaces 52d and 52d of the fixed die 52b at a position opposed to the inclined surfaces 52d and 52d of the fixed die 52b.

Figure 5C:
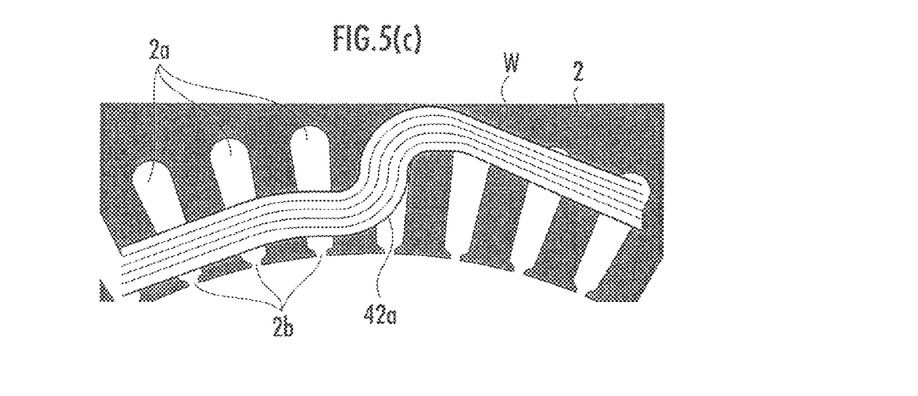

By moving the movable die 52a toward the fixed die 52b, the flat wire bundle W is bent in such a way that both lateral parts of the flat wire bundle W are made to be inclined toward the alignment direction. Thereby, as illustrated in FIG. 5(c), the flat wire bundle W is bent to match with the positions of the slots 2a disposed in the stator core 2 along the circumferential direction.

Figure 6A:
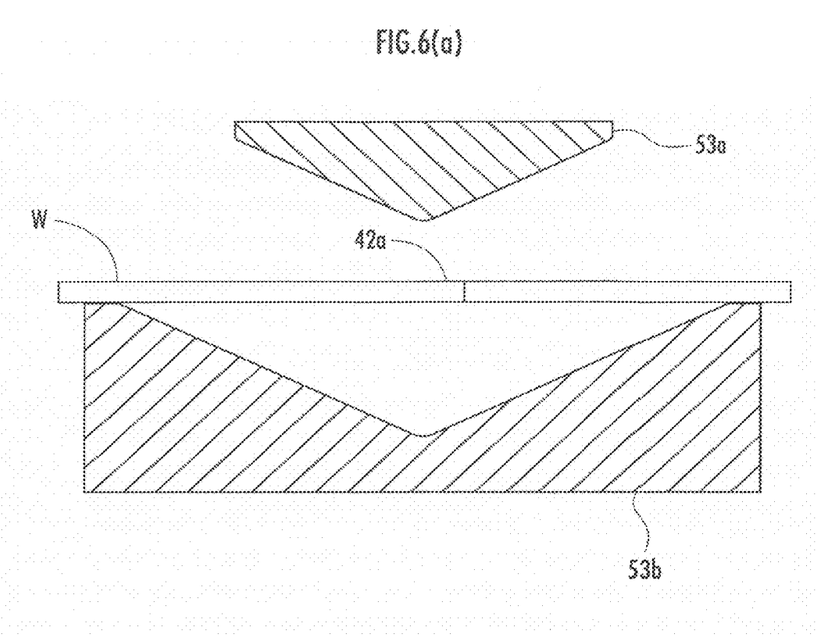
FIGS. 6(a) and 6(b) are explanatory views illustrating a head inclination forming step in the production method of the coil segment according to the present embodiment.
Figure 6B:
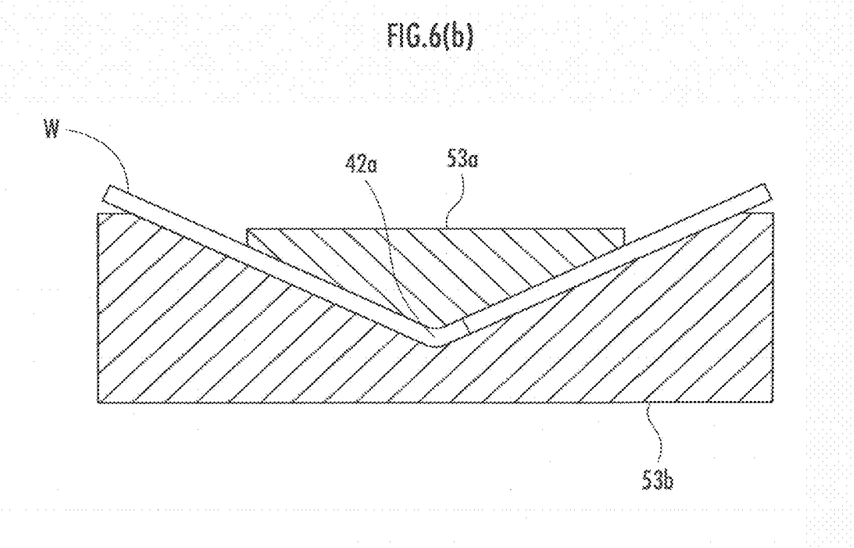

Thereafter, the procedure moves to a head inclination forming step illustrated in FIG. 6. In the head inclination forming step, a convex die 53a having inclined surfaces of a predetermined angle at both sides and a concave die 53b having inclined surfaces matching with the inclined surfaces of the convex die 53a are used to sandwich the flat wire bundle W and make the flat wire bundle W to be curved in such a way that the flat wire bundle W is made to be inclined downward from the center (the center of the S-shaped portion 42a).

Figure 7A:
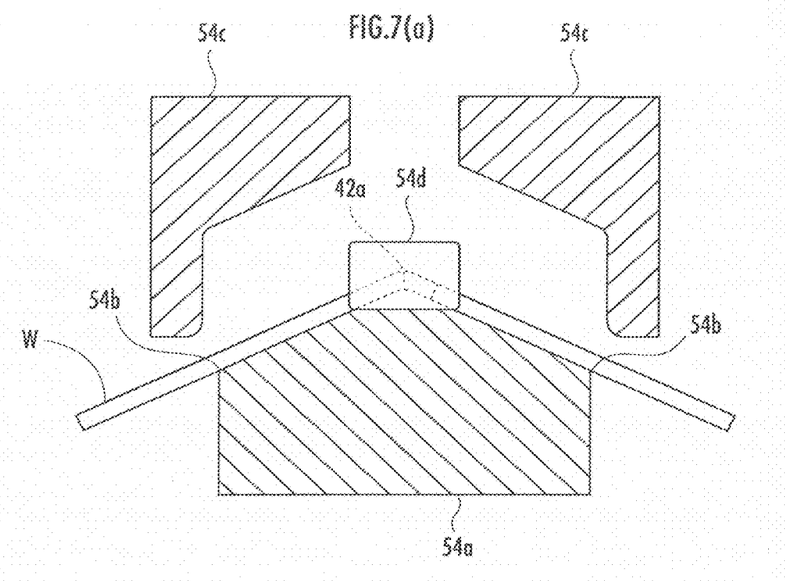
FIGS. 7(a) and 7(b) are explanatory views illustrating a leg forming step in the production method of the coil segment according to the present embodiment.
Figure 7B:
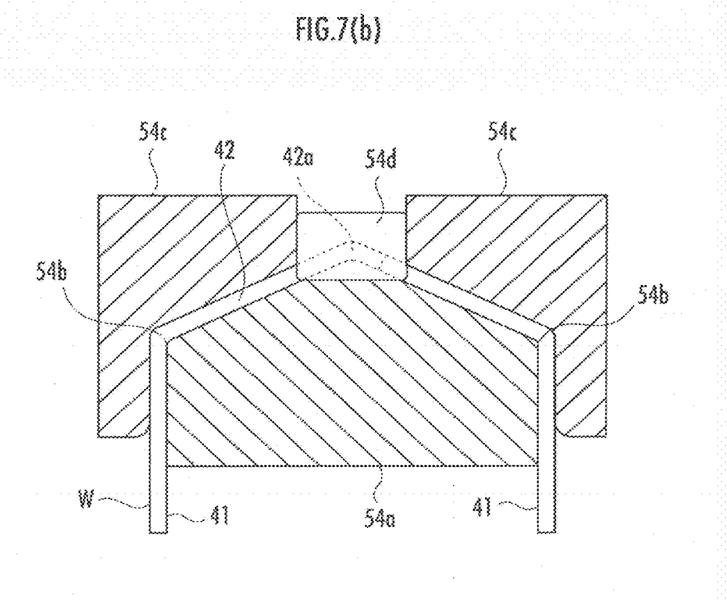

Subsequently, the procedure moves to a leg forming step illustrated in FIG. 7. A leg forming die 54a is used in the leg forming step. The upper surface of the leg forming die 54a has an identical shape to the inner surface of the head 42 of the coil segment 4, and both side surfaces thereof have an identical shape to the inner side surfaces of the leg 41 of the coil segment 4. A pair of L-shaped dies 54c and 54c is disposed at an upper position relative to the leg forming die 54a. The L-shaped die 54c has an L-shaped inner surface having an identical shape to a shoulder 54b joining the upper surface and each side surface of the leg forming die 54a. Further, a holder 54d is disposed in the center portion of the upper surface of the leg forming die 54a for holding the S-shaped portion 42a of the flat wire bundle W by sandwiching it in the alignment direction of the flat wire bundle W. In the leg forming step, by disposing the flat wire bundle W on the leg forming die 54a to be held by the holder 54d, and by moving the L-shaped dies 54c and 54c downwardly, both end portions of the flat wire bundle W is bent downwardly from the shoulders 54b of the leg forming die 54a to form the legs 41 and 41. According thereto, the coil segment 4 illustrated in FIG. 2 is formed.

According to the production method of the coil segment 4 in the present embodiment, a plurality of flat wires can be processed in bulk at one time. Thus, in comparison to the case where the flat wires are bent one by one by changing the bending curvature of each flat wire, the production efficiency of the coil segment 4 can be improved. Moreover, in the case of bending the flat wires one by one, it is necessary to prepare a die designed to have a corresponding curvature for each flat wire; however, according to the production method in the present embodiment, it is possible to produce all the flat wires that constitute one coil segment 4 by preparing only one die, thereby, the cost on production equipments can be reduced.

Figure 4A:
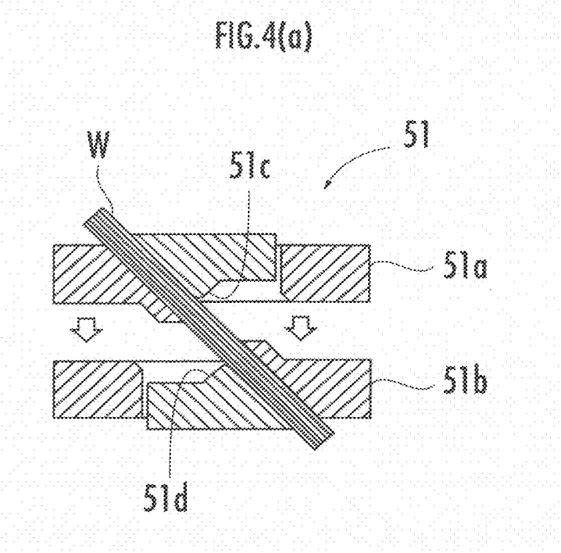
FIGS. 4(a) and 4(b) are explanatory view views illustrating an S-shape processing step in a production method of the coil segment according to the present embodiment.
Figure 4B:
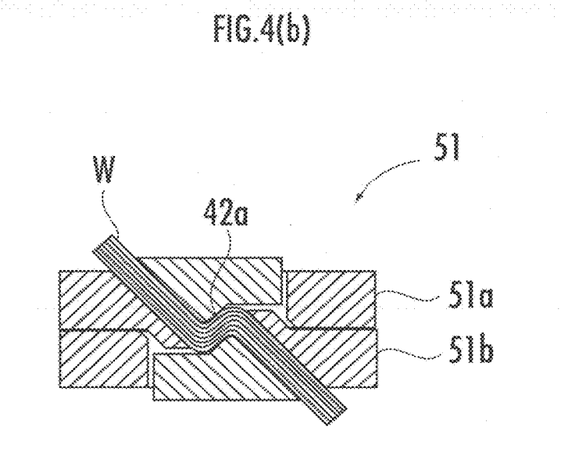

According to the production method of the coil segment 4 in the present embodiment, the circumferential direction bending step illustrated in FIG. 5 is performed after the formation of the S-shaped portion 42a in the S shape processing step illustrated in FIG. 4. In the circumferential direction bending step, the bending process is performed while the S-shaped portion 42a formed in the S shape processing step is being pressed by the holding member 52c. Thereby, since unnecessary force can be prevented from being applied to the S-shaped portion 42a in the circumferential direction bending step, it is possible to form the S-shaped portion 42a appropriately in comparison to the case where the S shape processing step and the circumferential direction bending step are performed simultaneously in a single die, for example.

Figure 8:
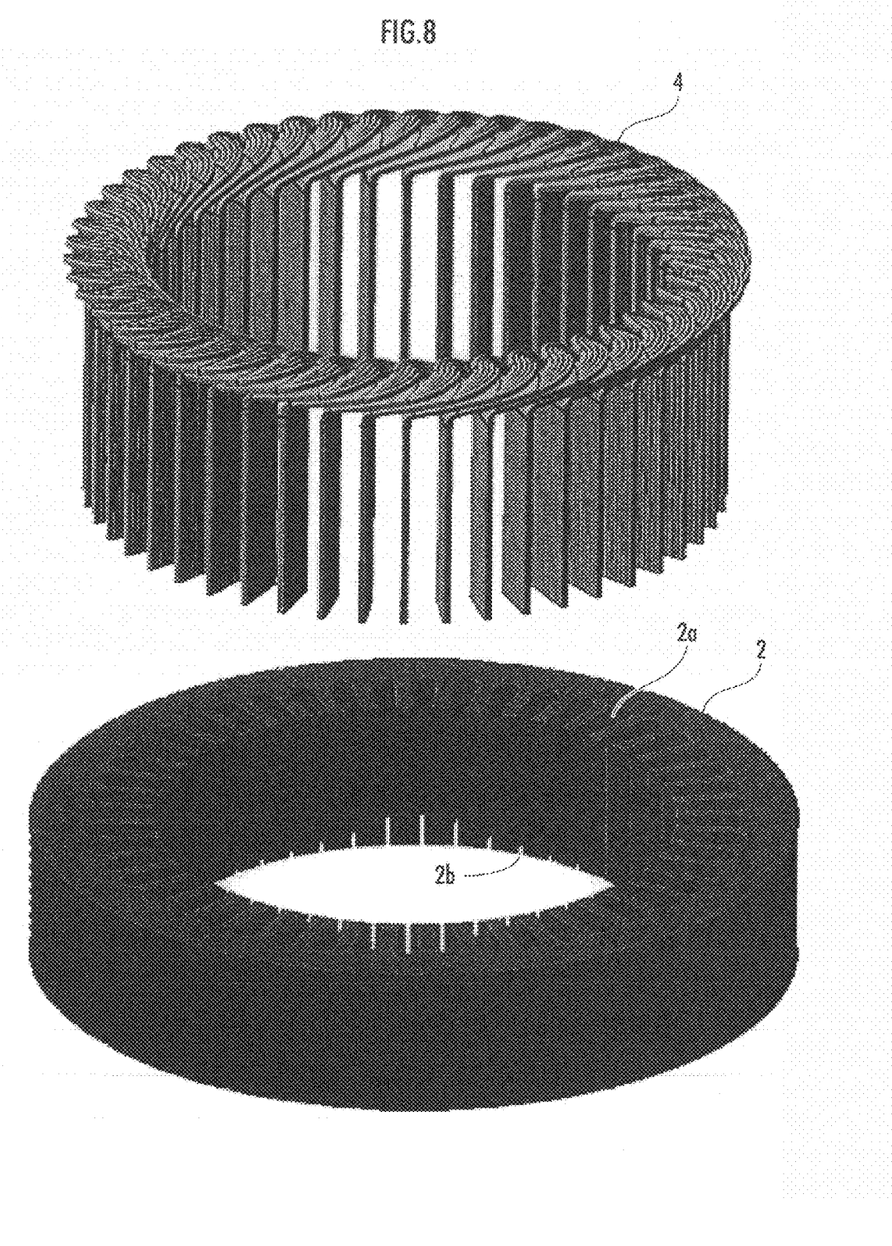
FIG. 8 is an explanatory view illustrating the coil segments aligned in the circumferential direction according to the present embodiment.
Figure 9A:
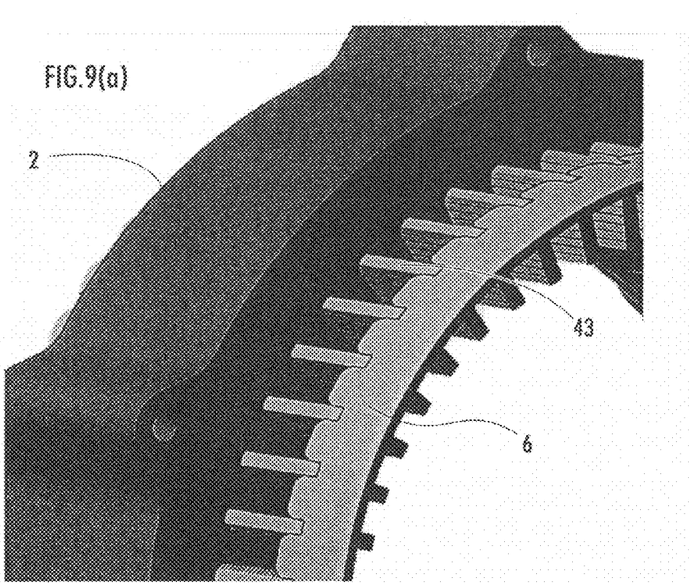
FIGS. 9(a) and 9(b) are explanatory views illustrating a torsional bending jig for torsionally bending the projecting portion of the coil segment in the circumferential direction according to the present embodiment.
Figure 9B:
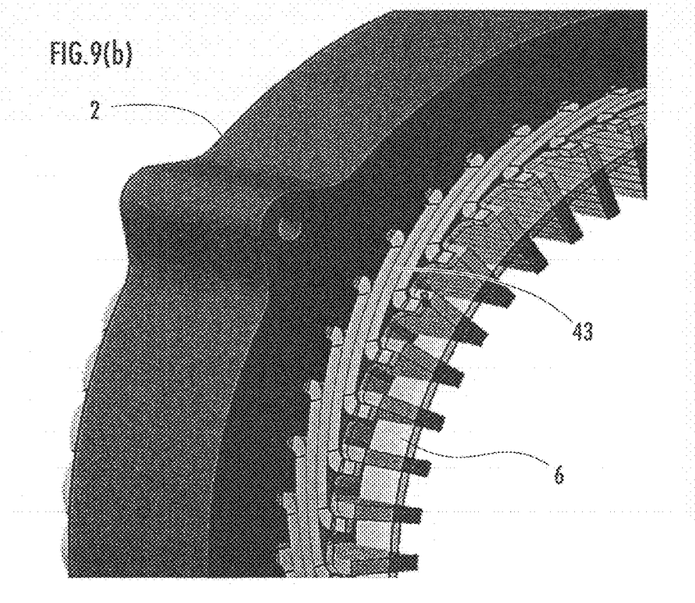

The coil segments 4 formed as mentioned in the above are aligned in correspondence with the positions of the slot 2a, partially overlapped in the circumferential direction, and the leg 41 is inserted into the slot 2a of the stator core 2, as illustrated in FIG. 8. The leg 41 is designed to have a predetermined length projecting from the lower side of the slot 2a. The projecting portion 43 projecting from the lower side of the slot 2a is torsionally bent in the circumferential direction by a torsional bending jig 6. The torsionally-bent projecting portion 43 is joined to another corresponding projecting portion 43 via TIG welding or the like. Thereby, the stator 1 is obtained.

According to the coil end structure in the present embodiment, since the adjacent flat wires are overlapped at the coil end in the circumferential direction of the stator 1, the coil end can be expected to be miniaturized. Further, a surface of a flat wire confronting a surface of another adjacent flat wire in the coil end is identical to the surface of the flat wire confronting the surface of the adjacent flat wire in the slot 2a. Thereby, a corner of a flat wire is prevented from contacting an adjacent flat wire as in the conventional coil end structure illustrated in FIG. 10, and as a result thereof, the insulation coating can be prevented from being peeled off.

Furthermore, one of the legs 41 and 41 of the coil segment 4 is positioned at the inner side in the radial direction of the slot 2a and the other one is positioned at the outer side in the radial direction of the slot 2a. Here, if the head is not formed with the S-shaped portion, since the head linearly joins the two legs, the region in the circumferential direction for alternating the inner side in the radial direction of the head and the outer side in the radial direction of the head becomes larger, and instead, the region for overlapping the heads of the coil segment at the coil end becomes narrower.

As described in the present embodiment, by forming the S-shaped portion 42a in the head 42, it is possible to make the region in the circumferential direction for alternating the inner side in the radial direction of the head and the outer side in the radial direction of the head smaller, which makes it possible to secure the region for overlapping the heads 42 of the coil segment 4 at the coil end wider. Thereby, the coil end can be expected to be miniaturized.

DESCRIPTION OF THE REFERENCE SIGNS

1 . . . a stator, 2 . . . a stator core, 2a . . . a slot, 3 . . . a coil, 4 . . . a coil segment, 41 . . . a leg, 42 . . . a head, 42a . . . an S-shaped portion, 43 . . . a projecting portion, 51 . . . an S shape processing die, 51a . . . a movable die, 51b . . . a fixed die, 51c . . . a convex portion, 51d . . . a convex portion, 52 . . . a circumferential direction bending die, 52a . . . a movable die, 52b . . . a fixed die, 52c . . . a holding member, 52d . . . an inclined surface of a fixed die, 52e . . . an inclined surface of a movable die, 53a . . . a convex die, 53b . . . a concave die, 54*a* . . . a leg forming die, 54*b* . . . a shoulder, 54*c* . . . an L-shaped die, 6 . . . a torsional bending jig, W . . . a flat wire bundle.

What is claimed is:

1. A coil end structure of a rotating electric machine comprising a stator and a rotor,
    the stator is provided with a stator core, a plurality of slots disposed in the stator core in such a way that the plurality of slots are disposed at intervals in a circumferential direction of the stator core and are configured to penetrate the stator core in an axial direction thereof, and a coil;
    the coil is constructed by disposing a plurality of U-shaped coil segments, each of which has a pair of legs and a head joining two legs at either one end portion of each leg, in such a way that the legs pass through the slot and project from the slot, and joining projecting portions of the legs projecting from the slot;
    each of the plurality of coil segments is constructed from a bundle of a plurality of flat wires that are aligned in a row so as to be side-by-side in a radial direction of the stator core at the pair of legs of the coil segment; and
    the head of the coil segment is a constituent component of the coil end and is disposed in such a way that adjacent flat wires are aligned in the circumferential direction of the stator,
    wherein a surface of a flat wire confronting a surface of another adjacent flat wire at the head of the coil segment, which constitutes the coil end, is identical to the surface of the flat wire confronting the surface of the adjacent flat wire at the leg inserted in the slot.

2. The coil end structure of a rotating electric machine according to claim 1, wherein the head of the coil end is formed with an S-shaped portion curved into an S shape.

3. The coil end structure of a rotating electric machine according to claim 1, wherein each of the plurality of flat wires has a narrow width surface and a wide width surface, and in the bundle of the plurality of flat wires, the plurality of flat wires are arranged with the wide width surface of each the plurality of flat wires confronting the wide width surface of another adjacent flat wire of the plurality of flat wires, and at the pair of legs of the coil segment, the wide width surface of each of the plurality of flat wires faces in the radial direction of the stator core.

4. A production method of a coil segment used in a coil end structure of a rotating electric machine comprising a stator and a rotor, the stator is provided with a stator core, a plurality of slots disposed in the stator core in such a way that the plurality of slots are disposed at intervals in the circumferential direction of the stator core and are configured to penetrate the stator core in the axial direction thereof, and a coil; the coil is constructed by disposing a plurality of U-shaped coil segments, each of which has a pair of legs and a head joining two legs at either one end portion of each leg, in such a way that the legs pass through the slot and project from the slot, and joining projecting portions of the legs projecting from the slot; the coil segment is constructed from a bundle of a plurality of flat wires; and the head of the coil segment is a constituent component of the coil end and is disposed in such a way that adjacent flat wires are aligned in the circumferential direction of the stator, wherein a surface of a flat wire confronting a surface of another adjacent flat wire at the head of the coil segment, which constitutes the coil end, is identical to the surface of the flat wire confronting the surface of the adjacent flat wire at the leg inserted in the slot, and the head of the coil end is formed with an S-shaped portion curved into an S shape,
    the production method comprising:
    an S shape processing step of forming the S-shaped portion by aligning a plurality of flat wires in a row into a bundle and curving a central portion of the flat wire bundle into an S shape in the alignment direction;
    a circumferential direction bending step of bending both end portions of the flat wire bundle with the S-shaped portion at the center in the alignment direction according to the position of the slot;
    a head inclination forming step of bending both end portions of the flat wire bundle to incline from the central portion at a predetermined angle toward the axial direction of the stator; and
    a leg forming step of forming the legs by bending both end portions of the flat wire bundle to conform to the penetrating direction of the slot.

5. The production method according to claim 4, wherein the circumferential direction bending step includes holding the S-shaped portion while bending both end portions of the flat wire bundle with the S-shaped portion at the center in the alignment direction according to the position of the slot.

6. The production method according to claim 5, wherein the leg forming step further includes holding the S-shaped portion while bending both end portions of the flat wire bundle to conform to the penetrating direction of the slot.

7. The production method according to claim 4, wherein the leg forming step further includes holding the S-shaped portion while bending both end portions of the flat wire bundle to conform to the penetrating direction of the slot.

8. The production method according to claim 4, wherein the S shape processing step, the circumferential direction bending step, the head inclination forming step, and the leg forming step are performed sequentially.

* * * * *

UNITED STATES PATENT AND TRADEMARK OFFICE
CERTIFICATE OF CORRECTION

PATENT NO.        : 8,552,611 B2
APPLICATION NO.   : 13/295285
DATED             : October 8, 2013
INVENTOR(S)       : Yoshihisa Matsuoka et al.

Page 1 of 1

It is certified that error appears in the above-identified patent and that said Letters Patent is hereby corrected as shown below:

On the title page, item (*), delete "This patent is subject to a terminal disclaimer."

Signed and Sealed this
Fourth Day of March, 2014

Michelle K. Lee
*Deputy Director of the United States Patent and Trademark Office*